United States Patent [19]

Rohrka et al.

[11] Patent Number: 5,437,911
[45] Date of Patent: Aug. 1, 1995

[54] COATED FILM FOR PACKAGING SLICED FOODSTUFFS

[75] Inventors: Heinz-Werner Rohrka, Kiedrich; Lothar Sieben, Nieder; Rolf Mueller; Wolfgang Funk, both of Wiesbaden, all of Germany

[73] Assignee: Wolff Walrode AG, Walsrode, Germany

[21] Appl. No.: 10,184

[22] Filed: Jan. 28, 1993

[30] Foreign Application Priority Data

Jan. 31, 1992 [DE] Germany .................. 42 02 727.6

[51] Int. Cl.⁶ .............................................. B32B 3/00
[52] U.S. Cl. ..................... 428/195; 428/35.2; 428/35.7; 428/198; 428/200; 428/334; 428/337; 428/341; 428/349; 428/351; 428/355; 428/423.7; 428/424.8; 428/447; 428/480; 428/483; 428/500; 428/515; 428/913
[58] Field of Search ............... 428/198, 35.2, 35.7, 428/200, 214, 349, 335, 423.7, 424.8, 480, 483, 500, 515, 913, 195, 219, 220, 334, 337, 341, 351, 447; 156/327, 332

[56] References Cited

U.S. PATENT DOCUMENTS

| | | | |
|---|---|---|---|
| 4,348,457 | 9/1982 | Rosenthal et al. | 428/349 |
| 4,419,410 | 12/1983 | Weiner | 428/516 |
| 4,419,411 | 12/1983 | Park | 428/516 |
| 4,419,494 | 12/1983 | Puletti et al. | 525/95 |
| 4,581,093 | 4/1986 | Noyes et al. | 156/307.3 |
| 4,666,772 | 5/1987 | Schinkel et al. | 428/330 |
| 4,716,061 | 12/1987 | Winter | 428/35 |
| 4,725,466 | 2/1988 | Crass et al. | 428/35 |
| 4,734,317 | 3/1988 | Bothe et al. | 428/215 |
| 4,842,930 | 6/1989 | Schinkel et al. | 428/349 |
| 5,089,319 | 2/1992 | Bothe | 428/216 |
| 5,102,734 | 4/1992 | Marbrow et al. | 428/349 |
| 5,232,776 | 8/1993 | Lu et al. | 428/349 |

FOREIGN PATENT DOCUMENTS

| | | |
|---|---|---|
| 0189242 | 7/1986 | European Pat. Off. . |
| 3509384 | 9/1986 | Germany . |
| 3517795 | 11/1986 | Germany . |
| 3624543 | 1/1988 | Germany . |
| 0372348 | 6/1990 | Germany . |
| 3940197 | 6/1991 | Germany . |

*Primary Examiner*—Patrick J. Ryan
*Assistant Examiner*—Marie R. Macholl
*Attorney, Agent, or Firm*—Sprung Horn Kramer & Woods

[57] ABSTRACT

A film for packaging sliced foodstuffs, such as, for example cheese slices, is wound around the foodstuff in the form of a tube lying flat and completely encloses the foodstuff, the two edge zones on the longitudinal axes of the film overlapping and being joined to one another by a full-surface or partial heat-sealable coating. The film comprises a monolayer or coextruded multilayer, in each case biaxially stretched and heat-fixed, film, which has full-surface or partial peelable heat-sealable coating and contains a water-repellant additive component mixture.

31 Claims, 1 Drawing Sheet

U.S. Patent   Aug. 1, 1995   5,437,911
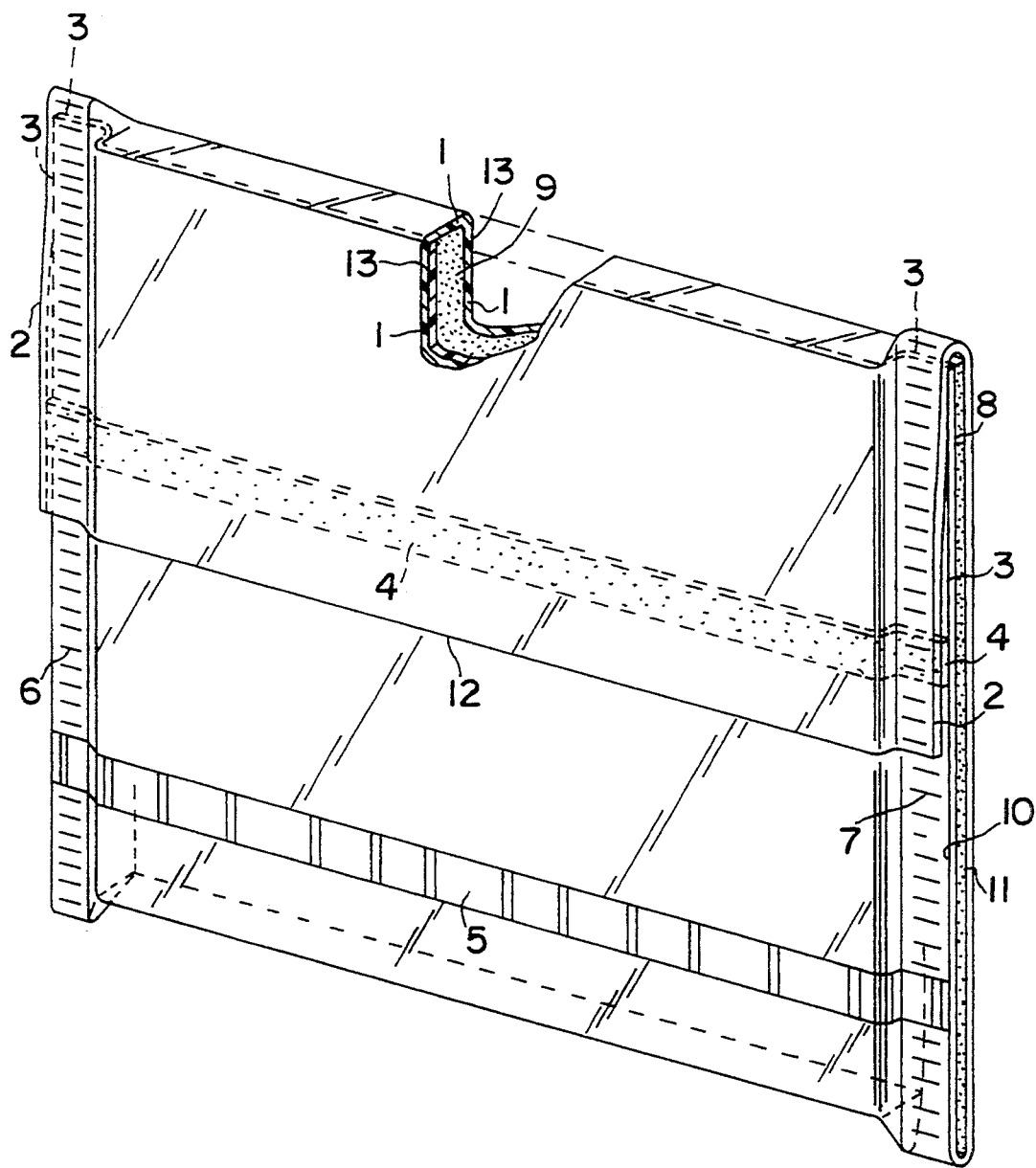

COATED FILM FOR PACKAGING SLICED FOODSTUFFS

BACKGROUND OF THE INVENTION

1. Field of the Invention

The invention relates to a coated film for packing sliced foodstuffs, in particular cheese slices, which film is wound about the foodstuff in the form of a tube lying flat and completely encloses said foodstuff. The two edge zones along the longitudinal axes of a base film overlap and are joined to one another by means of a full-surface or partial heat-sealable coating on a base film.

2. Description of Related Art

A packaging for sliced foodstuffs having an essentially rectangular surface area, in particular for cheese slices, is described in EP-A 0 372 348, which packaging comprises an optionally printed film which is wound around the foodstuff to be packaged in the form of a tube lying flat and completely encloses said foodstuff. The heat-sealable coating extends in strip form in the vicinity of and parallel to one edge of the film and essentially comprises a heat-sealable olefin copolymer. The outside of the packaging has a coating of a silicon-organic compound, for example a polydialkylsiloxane, whilst the film comprises a polyester or a polyolefin, in particular propylene polymers.

In order to prepare a packaging from such a film it is known to shape the film into a tube and to fill the heated, viscous cheese composition into the tube. The filled, tubular film rope is pressed flat and the cheese rope, which is now in strip form,, is subdivided by transverse web-like zones into individual filled sections which are still joined together. In order to cool and solidify the hot cheese composition, the film/cheese rope in strip form is fed through a waterbath and air is then blown onto the outside of the film in order to remove the water still adhering. Finally, the rope is subdivided into individually packed cheese slices in the region of the transverse web-like zones and the individual packs are stacked.

A polyolefin film where one sealable surface coating comprises polydialkylsiloxane and the other sealable surface coating has polydialkylsiloxane only on the outer surface has been described in DE-A 35 09 384. The multilayer film according to DE-A 35 17 795 also comprises a polydialkylsiloxane at least in one of the two non-sealable surface coatings. Both films can also be used for packaging purposes. However, neither publication provides those skilled in the art with an indication as to how to solve the problem of preventing blocking of an inadequately dried packaging.

Currently there are adhesion problems between the films used and the cheese of some cheese recipes. When the slices are unpacked, cheese adheres to the film, to a more or less pronounced extent depending on the temperature. The consequence of this is that the cheese slices are no longer shiny after unpacking but have a matt appearance.

In the case of the films used hitherto, depending on the type of installation, a relatively large amount of residual moisture still adheres to the film surface after blowing with air. As a result of this residual moisture, the coefficient of friction of the film surface is impaired and problems arise when stacking the individual packs. Consequently waste quotas are high in the sorting and stacking operation.

SUMMARY OF THE INVENTION

Accordingly, an object of the present invention is to provide an improved film for the packaging of sliced foodstuffs, in particular cheese slices, which film is preferably free from vinylidene chloride polymers and copolymers. The improved film provided should be able to be processed on the known slice installations and prevent cheese adhesion to both sides of the film. Furthermore, the coefficient of friction of the film surfaces should not be impaired by adhering residual moisture but should remain virtually constant compared with the dry state of the film surfaces.

Another object of the present invention is to provide a foodstuff which is packaged with such an improved film.

In accomplishing the foregoing objectives, there has been provided, in accordance with one aspect of the present invention a film useful for packaging foodstuffs such that the film is wound about the foodstuff in the form of a tube lying flat and completely encloses the foodstuff, wherein the two edge zones on the longitudinal axes of the film overlap and are joined to one another by a heat-sealable coating on the film.

In accordance with another aspect of the present invention, there has been provided a film comprising a monolayer film or coextruded multilayer film which is biaxially stretched and heat-set, wherein to the entire or a portion of the film are applied a peelable heat-sealable coating and a mixture of water-repellant components.

In accordance with another aspect of the present invention there is provided a method of using a film to package a foodstuff wherein the film is a monolayer film or coextruded multilayer film, which is biaxially stretched and heat-set, wherein the entire or a portion of the film contains a peelable heat-sealable coating and a mixture of water-repellant components.

In accordance with a further aspect of the present invention there is provided a foodstuff packaged with a film as described above.

In accordance with another aspect of the present invention there is provided a method of packaging sliced foodstuffs comprising winding around the foodstuff a film as described above so as to completely enclose the foodstuff, wherein the two edge zones of the longitudinal axes of the film overlap and are joined by heating the heat-sealable coating.

Further objects, features, and advantages of the present invention will become apparent from the detailed description of preferred embodiments that follows.

BRIEF DESCRIPTION OF THE DRAWINGS

FIG. 1 shows one embodiment of a packaged article formed from a film according to the invention.

DETAILED DESCRIPTION OF THE PREFERRED EMBODIMENTS

Many types of base film can be used in the present invention, preferably those that are either monolayered or coextruded, and biaxially stretched and heat set.

In a specific embodiment of the invention, the base film is a polyester film. Any polyester films are useful, in particular a polyethylene terephthalate film, which has a density of less than or equal to about 1.4 g/cm$^3$ and a thickness of from about 8 to about 30 μm, in particular from 10 to 23 μm is useful.

In another embodiment of the invention, the base film is a coextruded, multilayer, non-sealable film which has a base layer comprising a propylene polymer and top layers applied thereto on one or both sides, wherein the base film has a density of about 0.55 to about 0.91 g/cm$^3$ and a thickness in the range from about 8 to about 40 μm, in particular 10 to 25 μm. The top layers of the base film preferably comprise olefin polymers, in particular propylene polymers.

Expediently, the heat-sealable coating applied to a portion or all of the base film comprises peelable olefin copolymers and/or sealable polyester copolymers. In practice, the olefin copolymer generally comprises at least one each ethylene, propylene and butylene units. The copolymer is generally applied to the base film in the form of an aqueous dispersion or in the form of a solvent-containing coating composition and the solids content is preferably about 30 to about 70% by weight, with respect to the total weight of the dispersion or the coating composition.

The coating containing the polyester copolymer preferably contains four components, namely one of a polyester copolymer of polyethylene terephthalate, specifically having a molecular weight of about 5,000 to about 40,000 g/mol in an amount of 10 to 40% by weight of the polyester copolymer dispersion or coating composition, a polyester-urethane having a molecular weight of about 2,000 to about 10,000 g/mol in an amount of 1 to 15% by weight, a ketone resin in an amount of about 1 to about 20% by weight, and additives in an amount of 0.5 to 5% by weight. The term "molecular weight" denotes the weight average molecular weight, According to the invention, the polyester copolymer is generally applied in the form of an aqueous dispersion or solvent-containing coating composition having a solids content of 20 to 70% by weight.

In a further development of the invention, the heat-sealable coating comprising the polyester copolymer is about 1 to about 5 μm thick after removal of the dispersing agent or solvent and extends in the vicinity of and parallel to the edge zones of the film web with a width of about 1 to about 10 cm, in particular of about 2 to about 4 cm.

The water-repellant additive component mixture used according to the invention may be comprised of any known water repellant agents and is generally composed of polyethylene waxes or polypropylene waxes, fatty acid amides and polydialkylsiloxane. The water-repellant additive component mixture can also comprise polyethylene waxes, fatty acid amides and paraffins. The application weight of additive component mixture can vary depending on need and is generally applied from about 0.01 to about 20 g/m$^2$, in particular about 0.05 to about 1 g/m$^2$ of the film. Expediently, the additive component mixture is applied at the same time as the heat-sealable coating or incorporated directly into the heat-sealable coating before being applied to the film. The water-repellant component mixture is generally used to coat the full surface of the film, wherein the heat-sealable coating need only coat a portion of the film, i.e. that portion desired to be heat-sealed. The heat-sealable layer and the water-repellant component mixture may be applied to the film in any desired manner. For example, the mixture may be used to coat the film and then the heat-sealable coating applied or the heat-sealable coating may be applied first, or they may be applied at the same time. The film may be printed by gravure printing or flexographic printing.

FIG. 1 shows one embodiment of a packaging shape formed from the film 1 according to the invention, in perspective view, which is exploded in an upper section. The film 1 lies tightly on a rectangular cheese slice 9 and completely encloses the latter. Overlapping edge zones 2, 3 of the tubular film 1 bent around the cheese slice are joined together in the region of a heat-sealable coating 4 which is composed of a peelable olefin copolymer and/or a polyester copolymer and is in strip form. The heat-sealable coating 4 runs in the vicinity of and parallel to an edge 12 of the film and is, for example, about 1 to about 10, preferably about 2 to about 4 cm wide.

In the lower region of the packaging, there is a printed field 5, which is shown diagrammatically and contains, for example, various data about the packaged cheese in code form. As the exploded area in the FIGURE shows, a full-surface coating 13 is provided with an additive component mixture, on which there is, for example, printing ink if the film 1 is printed. Web-like regions 6, 7, in which two film layers 10 and 11 are superimposed, extend to the left and right of the packaged cheese slice at right angles to the heat-sealable coating 4. An extremely thin cheese layer 8 is enclosed between the film layers 10 and 11 and has the effect that the two superimposed film layers adhere to one another. In the remaining region of the packaging, the cheese layer or the adjacent cheese slices between the two regions 6 and 7 is or are considerably thicker than the cheese layer 8 and can have a thickness of up to 1 cm.

The application of the additive component mixture to provide water-repellant impregnation, to improve the coefficient of friction and to reduce the cheese/film adhesion, and the application of the partial or full-surface coating of heat-sealable and peelable olefin copolymer or polyester copolymer and the printing are generally carried out at the same time in a single operation. Alternately, the additive component mixture can be incorporated directly in the heat-sealable coating. The application of the heat-sealable coating and of the additive component mixture is expediently carried out on the same gravure or flexographic printing installation. The composition of the additive component mixture is illustrated with the aid of the following mixtures by which the percentages are based on the total weight of the mixture.

|  | Percent by weight (based on total weight of the mixture) |
| --- | --- |
| Mixture No. 1 | |
| Polyethylene waxes | 1 - 80% |
| Fatty acid amides | 1 - 85% |
| Polydialkylsiloxane | 1 - 90% |
| Mixture No. 2 | |
| Polypropylene waxes | 1 - 80% |
| Fatty acid amides | 1 - 85% |
| Polydialkylsiloxane | 1 - 90% |
| Mixture No. 3 | |
| Polyethylene waxes | 1 - 85% |
| Paraffins | 1 - 75% |
| Fatty acid amides | 1 - 85% |

Mixtures of two or more individual components of the above mixtures can also be used. A mixture in which each constituent makes up around ⅓ of the total mixture in by weight is suitable in practice.

As discussed previously, a film suitable for production of the packaging comprises a monolayer or coextruded multilayer polyester film, in particular a polyethylene terephthalate film, which has been orientated by biaxial stretching and heat-fixing. Its thickness is generally in the range from about 8 to about 30, in particular 10 to 23 micrometers. Similarly, films can be composed of transparent or opaque, monolayer biaxially stretched polyolefin films or of coextruded multilayer, biaxially stretched polyolefin films, the base layer being essentially composed of propylene polymers and the top layers, on one or both sides, being composed of olefin polymers, in particular propylene polymers. The density of the films is generally between about 0.55 and about 0.91 $g/cm^3$ and their thickness is generally in the range from about 8 to about 40, in particular 10 to 35 micrometers.

After removal of the dispersing agent or solvent, a partial or full-surface coating is obtained from the heat-sealable coating compositions. The thickness of the coating depends on the desired sealed seam strength. Usually, a layer thickness of about 1 to about 5 micrometers is applied, so that adequate sealing is obtained between seal coating and film, as well as obtaining peelable sealing of seal coating composition to seal coating composition. The partial, heat-sealable coating extends in the vicinity of and parallel to the edge zones of the film web and usually has a width of about 1 to about 10 cm, in particular about 2 to about 4 cm, as has already been explained above with reference to FIG. 1.

In order to produce the packaging, a tube for the goods to be packaged is first formed from the film on a vertical shaping/filling/closing machine and the seam on the longitudinal axis along the seal coating in strip form is formed. At the same time, the foodstuff, for example cheese, in paste form is filled into the tube from above. The filled tube is pressed flat and compressed in transverse web-like zones to such an extent that the pasty foodstuff is virtually completely removed between the two film layers of the web-like regions 5 and 6. After passing through a cold water bath, the flat film tube is separated at right angles to the seal seam in the web-like zones. At the two separation edges, the packaging is closed only by compressing the superimposed film layers, the film layers being stuck together by small amounts of foodstuff which is between them and has solidified on cooling. After cooling in the water bath and separating the web-like zones, the goods to be packaged, for example a rectangular cheese slice, is encased in the film, which lies tightly on the goods, and the two overlapping edge zones of the film are sealed in the area of the heat-sealable coating.

The improved surface properties and the heat-sealability of the films to be used for the packagings are illustrated with the aid of the following examples.

EXAMPLE 1

Two films, a monolayer, biaxially stretch-oriented polyethylene terephthalate film (PET) having a thickness of 12 micrometers and a coextruded three-layer, non-sealable biaxially-oriented polypropylene film (BOPP) having a thickness of 15 micrometers, are coated over the full surface by flexographic printing with additive component mixture No. 1: immediately thereafter a partial coating of a coating composition composed of ethylene/propylene copolymer is applied.

EXAMPLE 2

Two films, a monolayer, biaxially stretch-oriented PET film having a thickness of 12 micrometers and a coextruded three-layer, non-sealable BOPP film having a thickness of 15 micrometers, are first coated over the full surface with a polyester copolymer and immediately thereafter additive component mixture No. 2 is applied to the seal coating over the full surface.

EXAMPLE 3

Two films, a monolayer, biaxially stretch-oriented PET film having a thickness of 12 micrometers and a coextruded three-layer, non-sealable BOPP film having a thickness of 15 micrometers, are coated over the full surface with a polyester copolymer. Additive component mixture No. 3 is incorporated in this polyester coating composition.

The coefficient of friction and the results of cheese/film adhesion was evaluated for all six samples. The results are seen in the following table. The cheese used was a very soft processed cheese, which has a lactose content of more than 5%. The coefficient of friction was determined in accordance with the TNO method (published in "Measurement of Coefficient of Friction at Flexible Packaging Materials", J. W. Dorsteen and E. Mot., Packaging India, Vol. 5 No. 3, April/June 1973) before contact with water and after contact with water and blowing the water adhering to the film off with air.

A polyvinylidene chloride (PVDC)-coated PET film, which customarily is used in the production of cheese slices, was used as a comparison film. Coating with an additive component mixture was omitted.

|  | Coefficient of Friction | | | |
| --- | --- | --- | --- | --- |
|  | Before contact with water | | After contact with water and drying | |
|  | Side A | Side B | Side A | Side B |
| Example 1 | | | | |
| PET/seal strips | 0.10–0.15 | 0.12–0.17 | 0.12–0.15 | 0.14–0.19 |
| BOPP/seal strips | 0.10–0.15 | 0.12–0.17 | 0.12–0.15 | 0.14–0.19 |
| Example 2 | | | | |
| PET/seal coatings | 0.10–0.15 | 0.12–0.17 | 0.12–0.15 | 0.14–0.19 |
| BOPP/seal coatings | 0.10–0.15 | 0.12–0.17 | 0.12–0.15 | 0.14–0.19 |
| Example 3 | | | | |
| PET/seal strips | 0.12–0.16 | 0.14–0.18 | 0.14–0.18 | 0.16–0.2 |
| BOPP seal strips | 0.12–0.16 | 0.14–0.18 | 0.14–0.18 | 0.16–0.2 |
| PET/PVDC | 0.19–0.21 | 0.22–0.25 | 0.25–0.30 | 0.28–0.32 |

Upon blowing with air, the films from Examples 1 to 3 showed a lower adhesion of water to the film surface than the PVDC-coated PET film.

In order to assess the cheese-to-film adhesion, warm processed cheese at 90° C. was poured onto the films and both were immediately cooled with water. The results are shown in the following table.

Assessment
+ + No adhesion, cheese falls away from the film +
   Cheese surface is shiny.
Slight adhesion, cheese can still readily be separated from the film.
0 Cheese is more difficult to separate from the film, cheese surface is partially matt.
− Cheese is difficult to separate from the film, cheese surface is matt.

|              | Side A | Side B |
|--------------|--------|--------|
| Example 1    |        |        |
| PET/seal strips | ++   | +      |
| BOPP/seal strips | ++  | +      |
| Example 2    |        |        |
| PET/seal strips | ++   | +      |
| BOPP/seal strips | ++  | +      |
| Example 3    |        |        |
| PET/seal strips | +    | +      |
| BOPP/seal strips | +   | 0      |
| PET/PVDC     | 0      | 0      |

In order to check the strength of the seal seam, the coating composition was sealed against the film and the coating composition was sealed against another coating composition at 130° C. and 5 bar pressure for 0.5 sec. Test strips 10 cm long and 15 mm wide were cut from the sealed samples.

When the PVDC coating is sealed against an uncoated PET film no join results and when PVDC is sealed against PVDC a force of 1N/15 mm is needed to separate the films from one another. In contrast, the force which is needed to strip the polyester film and polypropylene film with the ethylene copolymer layer and the polyester seal coating from the uncoated film sealed against it is 0.3 to 0.8N/15 mm. When the seal coating is sealed against seal coating, values of 0.8 to 1.5N/15 mm are obtained.

What is claimed is:

1. A coated film useful for packaging sliced foodstuffs, which film is wound about said foodstuff in the form of a tube lying flat and completely enclosing said foodstuff, whereby two edge zones along the longitudinal axis of the film overlap and are joined to one another by means of a peelable heat-sealable coating applied to at least a portion of a base film, said heat-sealable coating comprising an olefin copolymer and polyester copolymer, said base film comprising a monolayer film or coextruded multilayer film, which is biaxially stretched and heat-fixed, wherein applied to at least a portion of said base film is a mixture of water-repellant components.

2. A coated film as claimed in claim 1, wherein said base film is a monolayer film comprising polyester.

3. A coated film as claimed in claim 2, wherein said polyester of said base film is a polyethylene terephthalate which has a density of less than or equal to about 1.4 g/cm$^3$ and a thickness of from about 8 to about 30 μm.

4. A coated film as claimed in claim 1, wherein said base film is a multilayer film comprising polypropylene as a base layer.

5. A coated film as claimed in claim 4, wherein said base film is a coextruded, multilayer, non-sealable film which has a base layer containing polypropylene and top layers applied thereto on one or both sides, wherein said base film has a density of about 0.55 to about 0.91 g/cm$^3$ and a thickness in the range from about 8 to about 40 μm.

6. A coated film as claimed in claim 5, wherein the top layers of said base film comprise olefin polymers.

7. A coated film as claimed in claim 6, wherein said olefin polymers are propylene polymers.

8. A coated film as claimed in claim 1, wherein the peelable heat-sealable coating comprises an olefin copolymer comprising at least one each of ethylene, propylene, and butylene units.

9. A coated film as claimed in claim 1, wherein the peelable heat-sealable comprises coating a polyester copolymer of polyethylene terephthalate, having a molecular weight of about 5,000 to about 40,000 g/mol in an amount of 10 to 40% by weight, a polyester-urethane having a molecular weight of about 2,000 to about 10,000 g/mol in an amount of 1 to 15% by weight, a ketone resin in an amount of 1 to 20% by weight, and additives in an amount of 0.5 to 5% by weight, the percent by weight of each component being related to the weight of total solid content.

10. A coated film as claimed in claim 9, wherein the peelable heat-sealable coating is about 1 to about 5 μm thick after removal of any dispersing agent or solvent used for coating and extends in the vicinity of and substantially parallel to an edge zone of the base film in a width of about 1 to about 10 cm.

11. A coated film as claimed in claim 1, wherein the water-repellant components comprise a mixture of polyethylene waxes or polypropylene waxes, fatty acid amides, and polydialkylsiloxane.

12. A coated film as claimed in claim 1, wherein the water-repellant components comprise a mixture of polyethylene wax, fatty acid amides, and paraffins.

13. A coated film as claimed in claim 1, wherein the weight of the mixture of water-repellant components applied is from about 0.01 to about 20 g/m$^2$ of film.

14. A coated film as claimed in claim 1, wherein the mixture of water-repellant components coats substantially the entire surface of said base film.

15. A coated film as claimed in claim 1, wherein the peelable heat-sealable coating coats substantially the entire surface of said base film.

16. A coated film as claimed in claim 1, wherein the peelable heat-sealable coating coats only a portion of said base film, wherein the portion extends in the vicinity of and substantially parallel to an edge zone of said base film in a width of about 1 to about 10 cm.

17. A coated film as claimed in claim 1, wherein the water-repellant component mixture is incorporated directly into the peelable heat-sealable coating.

18. A coated film as claimed in claim 1, wherein said water-repellant component mixture and peelable heat-sealable coating are applied to both sides of said base film.

19. A coated film as claimed in claim 1, wherein the water-repellant component mixture or the peelable heat-sealable coating, respectively, is first applied to the base film surface, and then the peelable heat-sealable coating or the water-repellant component mixture, respectively, is applied.

20. A coated film as claimed in claim 1, wherein the water-repellant component mixture is applied at the same time as the peelable heat-sealable coating.

21. A coated film useful for packaging sliced foodstuffs, which film is wound about said foodstuff in the form of a tube lying flat and completely enclosing said foodstuff, whereby two edge zones along the longitudinal axis of the film overlap and are joined to one another by means of a heat-sealable coating, said coated film comprising a base film which is biaxially stretched and heat-fixed, at least a portion of both sides of said base film being coated with a peelable heat-sealable coating and a mixture of water-repellant components, said mixture of water-repellant components comprising polydialkylsiloxane and having an application weight of about 0.01 to about 20 g/m$^2$ of film, said peelable heat-sealable coating comprising a polyester copolymer of polyethylene terephthalate, having a molecular weight of about 5,000 to about 40,000 g/mol in an amount of 10 to 40 parts by weight, a polyester-urethane having a molecular weight of about 2,000 to about 10,000 g/mol in an amount of 1 to 15 parts by weight, a ketone resin in an amount of 1 to 20 parts by weight, and additives in an amount of 0.5 to 5 parts by weight of total solid content.

22. A coated film as claimed in claim 21, wherein both sides of said base film are completely coated with said mixture of water-repellant components.

23. A coated film as claimed in claim 22, wherein said mixture of water-repellant components comprises polyethylene waxes or polypropylene waxes, and fatty acid amides.

24. A coated film as claimed in claim 22, wherein said mixture of water-repellant components comprises polyethylene wax, fatty acid amides, and paraffins.

25. A coated film as claimed in claim 22, wherein said base film is a monolayer film comprising polyester.

26. A coated film as claimed in claim 22, wherein said base film is a multilayer film comprising polypropylene as a base layer.

27. A coated film as claimed in claim 26, wherein said base film is a coextruded, multilayer, non-sealable film which has a base layer containing polypropylene and top layers applied thereto which comprise olefin polymers.

28. A coated film as claimed in claim 21, wherein the peelable heat-sealable coating is about 1 to about 5 μm thick after removal of any dispersing agent or solvent used for coating and extends in the vicinity of and substantially parallel to an edge zone of the film in a width of about 1 to about 10 cm.

29. A packaged foodstuff which is easily unpacked without damaging a surface appearance of the foodstuff and which has a coefficient of friction on an outer surface which is substantially unaffected by moisture, said packaged foodstuff comprising a sliced foodstuff having a shiny surface appearance and a film which is wrapped around said foodstuff, said film comprising a base layer with two sides and a property of adhering to said foodstuff, a heat-sealable coating applied to at least a portion of said base layer, and a mixture of water-repellant components applied to both sides of said base layer at the same time as said heat-sealable coating to facilitate removal of said film from said foodstuff without damaging the surface appearance thereof and to reduce waste quotas when said packaged foodstuff is stacked, said film further having two oppositely disposed edge zones which overlap when said film is wrapped around said foodstuff and which are joined to one another by means of said heat-sealable coating, said heat-sealable coating comprising an olefin copolymer and polyester copolymer.

30. A packaged foodstuff according to claim 29, wherein said foodstuff is a processed cheese, said base layer is a monolayer polyester film, and said mixture of water-repellant components comprise polydialkylsiloxane.

31. A packaged foodstuff according to claim 29, wherein said foodstuff is a processed cheese, said base layer is a coextruded multilayer film containing an inner layer of polypropylene and outer layers of olefin polymers, and said mixture of water-repellant components comprises polydialkylsiloxane.

* * * * *

UNITED STATES PATENT AND TRADEMARK OFFICE
CERTIFICATE OF CORRECTION

PATENT NO. : 5,437,911
DATED : August 1, 1995
INVENTOR(S) : Rohrka, et al.

It is certified that error appears in the above-indentified patent and that said Letters Patent is hereby corrected as shown below:

Col. 8, line 2,   Delete " comprises coating "and substitute
                  -- coating comprises --

Col. 10, line 27  Delete " comprise " and substitute
                  -- comprises --

Signed and Sealed this

Fifth Day of March, 1996

Attest:

BRUCE LEHMAN

*Attesting Officer*   Commissioner of Patents and Trademarks